United States Patent
Mahalingam et al.

(10) Patent No.: US 11,963,237 B2
(45) Date of Patent: Apr. 16, 2024

(54) METHODS, APPARATUS, SYSTEMS AND PROCEDURES FOR DISTANCE DEPENDENT RANDOM ACCESS CHANNEL (RACH) PREAMBLE SELECTION IN NON-TERRESTRIAL NETWORKS (NTNS)

(71) Applicant: InterDigital Patent Holdings, Inc., Wilmington, DE (US)

(72) Inventors: Nagi Mahalingam, San Diego, CA (US); Anantharaman Balasubramanian, San Diego, CA (US); Ravikumar V. Pragada, Warrington, PA (US); Faris Alfarhan, Montreal (CA); Yugeswar Deenoo, Chalfont, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 308 days.

(21) Appl. No.: 17/289,143

(22) PCT Filed: Oct. 22, 2019

(86) PCT No.: PCT/US2019/057390
§ 371 (c)(1),
(2) Date: Apr. 27, 2021

(87) PCT Pub. No.: WO2020/092059
PCT Pub. Date: May 7, 2020

(65) Prior Publication Data
US 2021/0385879 A1 Dec. 9, 2021

Related U.S. Application Data

(60) Provisional application No. 62/752,453, filed on Oct. 30, 2018.

(51) Int. Cl.
*H04W 74/08* (2009.01)
*H04W 72/1263* (2023.01)
*H04W 74/0833* (2024.01)

(52) U.S. Cl.
CPC ... *H04W 74/0841* (2013.01); *H04W 72/1263* (2013.01); *H04W 74/0866* (2013.01)

(58) Field of Classification Search
CPC ......... H04W 74/0841; H04W 72/1263; H04W 74/0866; H04W 56/0045; H04W 74/006;
(Continued)

(56) References Cited

U.S. PATENT DOCUMENTS 8,130,667 B2 3/2012 Bertrand et al.
8,493,994 B2 7/2013 Park et al.
(Continued)

FOREIGN PATENT DOCUMENTS

CN 101416556 A 4/2009
CN 103346829 A 10/2013
(Continued)

OTHER PUBLICATIONS

3GPP TSG-RAN WG1 RL1, Huawei R1-061247 "System performance of RACH preamble designs for E-UTRA", Apr. 28, 2006, pp. 1-4.
(Continued)

*Primary Examiner* — Thai Nguyen
(74) *Attorney, Agent, or Firm* — Majid Albassam

(57) ABSTRACT

Method, apparatus and systems are disclosed. In one representative embodiment, a method may be implemented by a wireless transmit/receive unit (WTRU) for communication via a network access point (NAP). The method may include the WTRU receiving from the NAP a set of preambles and corresponding propagation delay related thresholds and determining propagation delay related information associ-
(Continued)

ated with a distance between the WTRU and the NAP or a location in a coverage of the NAP. The method may further include selecting a subset of preambles from the set of preambles based on the determined propagation delay related information, randomly selecting a preamble from the selected subset of preambles, and sending the randomly selected preamble to the NAP.

20 Claims, 7 Drawing Sheets

(58) Field of Classification Search
CPC ......... H04W 74/0833; H04W 56/0065; H04W 72/0413; H04L 5/0053; H04B 7/18506
See application file for complete search history.

(56) References Cited

U.S. PATENT DOCUMENTS

| | | | |
|---|---|---|---|
| 9,363,778 | B2 | 6/2016 | Haartsen et al. |
| 10,631,330 | B2 | 4/2020 | Vajapeyam et al. |
| 2004/0152421 | A1 | 8/2004 | Erlenbach et al. |
| 2007/0230600 | A1 | 10/2007 | Bertrand et al. |
| 2009/0011769 | A1 | 1/2009 | Park et al. |
| 2009/0042582 | A1* | 2/2009 | Wang ............ H04W 74/0866 455/450 |
| 2011/0039499 | A1 | 2/2011 | Zhang et al. |
| 2014/0044108 | A1* | 2/2014 | Earnshaw ............ G01S 5/0063 370/336 |
| 2014/0286261 | A1* | 9/2014 | Vujcic ............... H04W 74/0866 370/329 |
| 2015/0016312 | A1 | 1/2015 | Li et al. |
| 2015/0181544 | A1 | 6/2015 | Liu et al. |
| 2016/0119887 | A1* | 4/2016 | Charipadi ........... H04J 13/0062 370/335 |
| 2016/0270121 | A1 | 9/2016 | Bergström et al. |
| 2018/0255490 | A1 | 9/2018 | Hou et al. |
| 2018/0270867 | A1 | 9/2018 | Yi et al. |
| 2018/0279380 | A1 | 9/2018 | Jung et al. |
| 2019/0223226 | A1 | 7/2019 | Zhao et al. |
| 2021/0175964 | A1* | 6/2021 | Kusashima ........ H04B 7/18513 |

FOREIGN PATENT DOCUMENTS

| | | |
|---|---|---|
| CN | 107006037 A | 8/2017 |
| CN | 107026721 A | 8/2017 |
| CN | 107432042 A | 12/2017 |
| EP | 1142149 A2 | 10/2001 |
| JP | 2004274794 A | 9/2004 |
| JP | 2009521892 A | 6/2009 |
| JP | 2013501463 A | 1/2013 |
| JP | 2016528791 A | 9/2016 |
| RU | 2499364 C2 | 11/2013 |
| WO | WO 2012106798 A1 | 8/2012 |
| WO | WO 2018058478 A1 | 4/2018 |

OTHER PUBLICATIONS

3GPP TSG-RAN\WG1 RL1—ZTE, Sanechips "R1-1801830 Considerations on random access in NTN", Feb. 13, 2018, pp. 1-3.
Thales, "Study on solutions for NR to support non-terrestrial networks (NTN)," 3GPP TSG RAN meeting #83, RP-190710, Shenzen, China (Mar. 18-21, 2019), 6 pages.
"Part 11: Wireless LAN Medium Access Control (MAC) and Physical Layer (PHY) Specifications", IEEE Computer Society, LAN MAN Standards Committee, IEEE Standard 802.11-1997, Jun. 26, 1997, 459 pages.
"3rd Generation Partnership Project; Technical Specification Group Radio Access Network; NR; Physical layer procedures for control (Release 15)," 3GPP TS 38.213 V15.3.0 (Sep. 2018), 445 pages.
"3rd Generation Partnership Project; Technical Specification Group Radio Access Network; NR; Radio Resource Control (RRC) protocol specification (Release 15)," 3GPP TS 38.331 V15.3.0 (Sep. 2018), 101 pages.
Thales, IDC, NR-NTN: Solution Principles for NR to Support Non-terrestrial Networks [online], 3GPP TSG RAN WG1 #93 R1-1807864, Internet<URL:http://www.3gpp.org/ftp/tsg_ran/WG1_RL1/TSGR1_93/Docs/R1-1807864.zip>, Mar. 29, 2018, 14 pages.

* cited by examiner

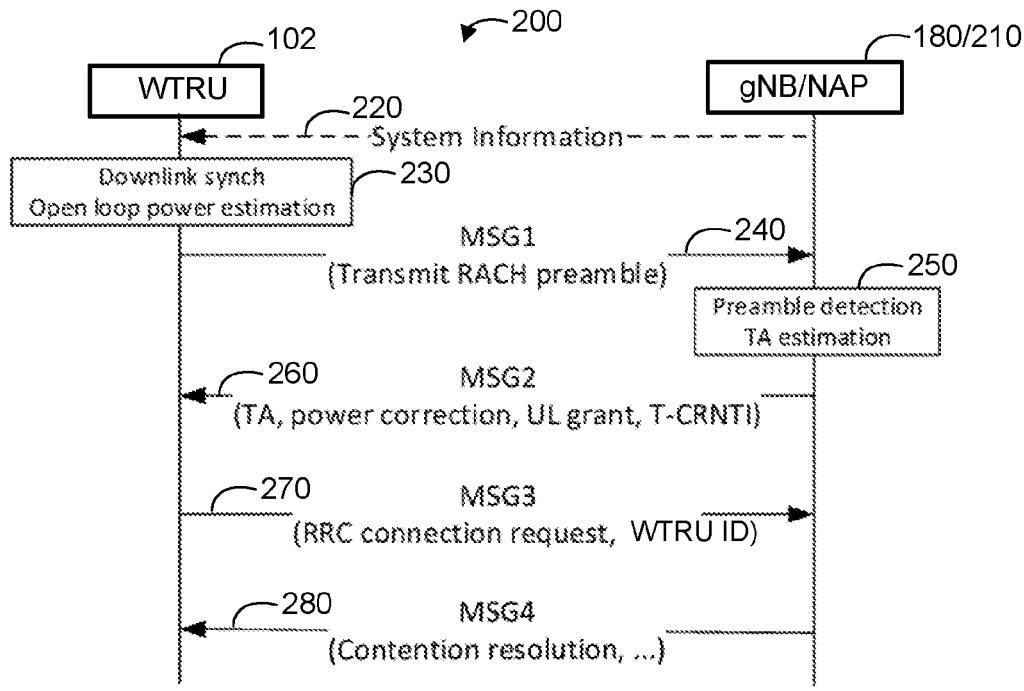
FIG. 2: RRC Connection From Idle
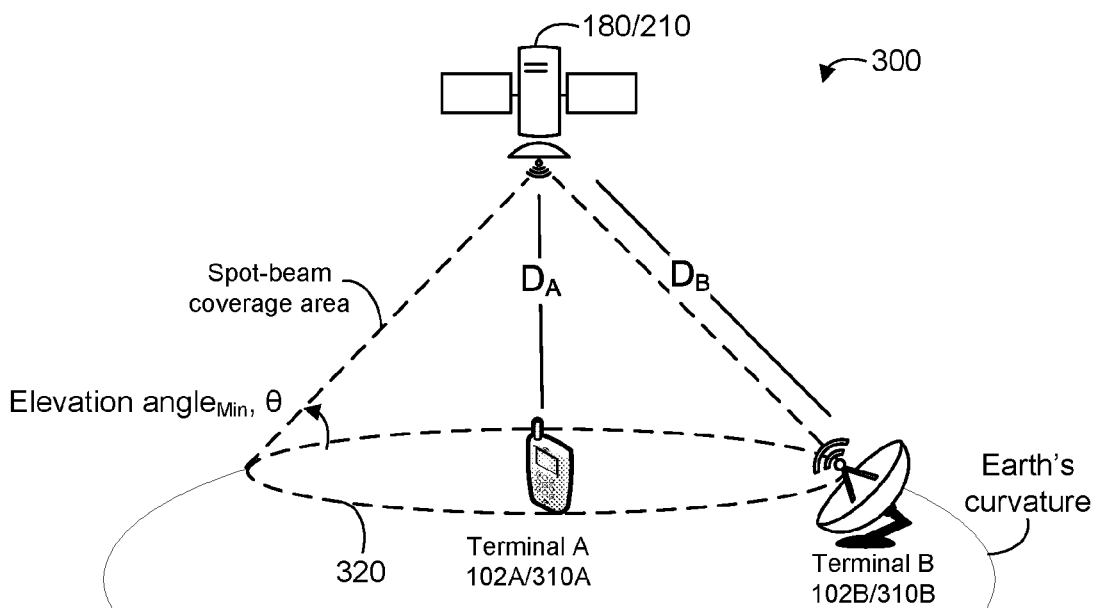
FIG. 3: Variance in Propagation Delay Inside a Spot-Beam

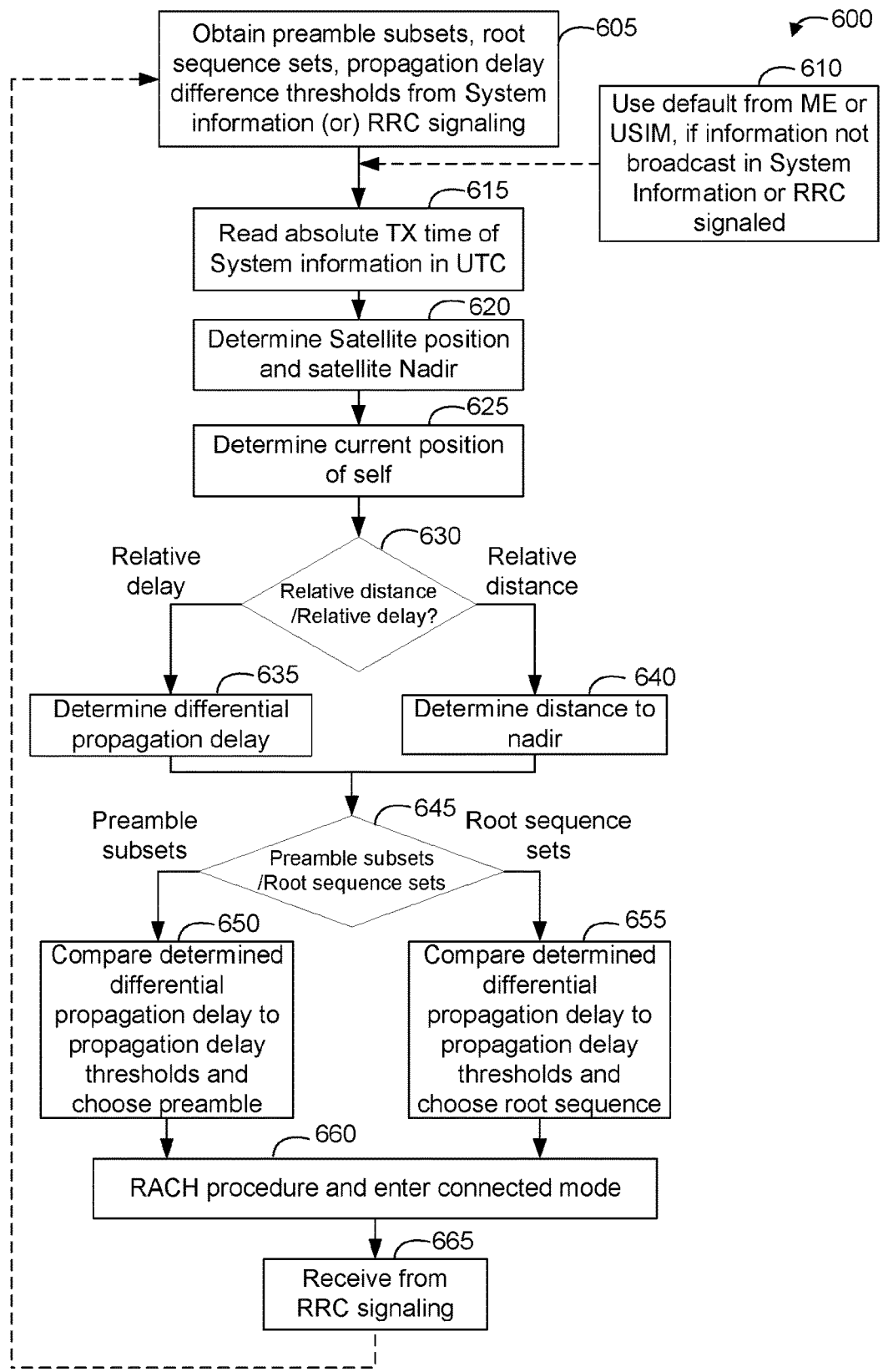
FIG. 6: Flowchart for Distance Dependent RACH Preamble in NTN

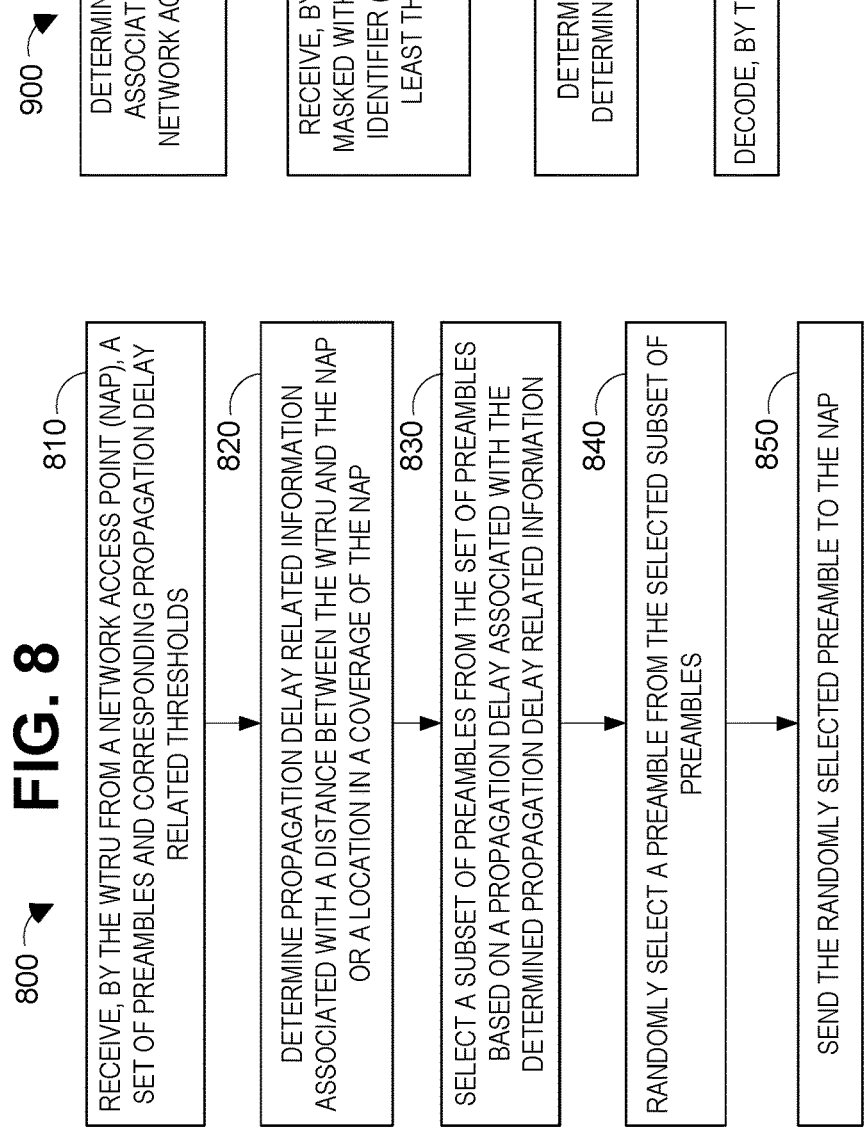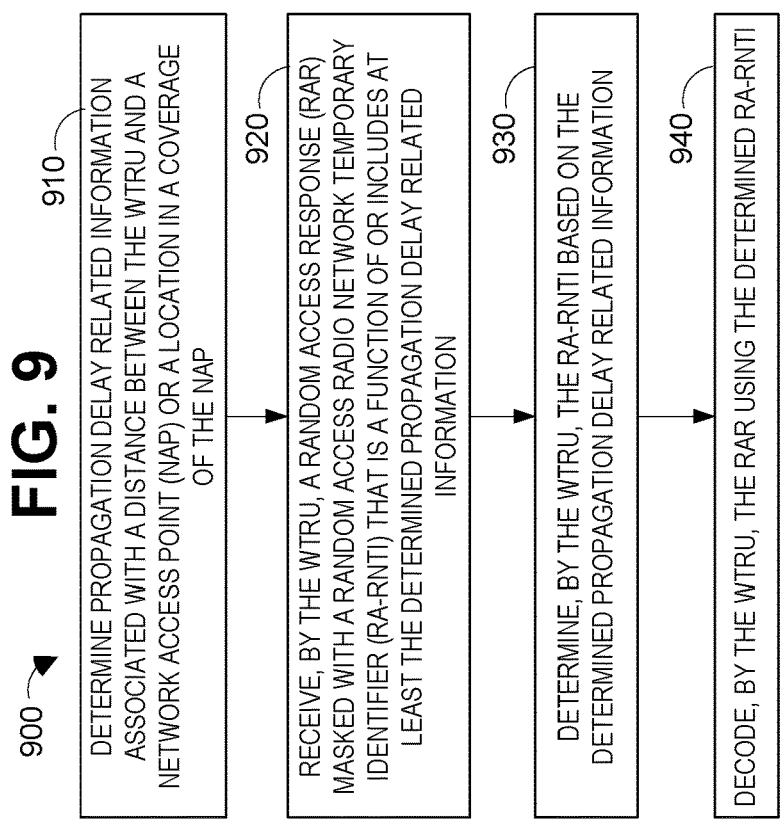

METHODS, APPARATUS, SYSTEMS AND PROCEDURES FOR DISTANCE DEPENDENT RANDOM ACCESS CHANNEL (RACH) PREAMBLE SELECTION IN NON-TERRESTRIAL NETWORKS (NTNS)

CROSS REFERENCE TO RELATED APPLICATIONS

This application is a §371 U.S. National Stage entry of PCT Application No. PCT/US2019/057390, filed Oct. 22, 2019, which is a non-provisional filing of, and claims priority from U.S. Provisional Application No.: 62/752,453, filed Oct. 30, 2018, the contents of each of which are incorporated herein by reference as if fully set- forth herein in their respective entirety, for all purposes.

FIELD

Embodiments disclosed herein generally relate to wireless communications and, for example to methods, apparatus and systems for distance dependent RACH preamble selection in NTNs.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 2 is a diagram illustrating a representative Radio Resource Control (RRC) connection establishment procedure;

FIG. 3 is a diagram illustrating a variance in propagation delay inside a spot-beam;

FIG. 6 is an overall flowchart illustrating a representative procedure for selection of distance dependent RACH preambles in a NTN;

FIG. 8 is flowchart illustrating another representative procedure for selection of RACH preambles based on propagation delay related parameters/information; and FIG. 9 is flowchart illustrating another representative procedure using a Random Access-Radio Network Temporary Identifier (RA-RNTI) as a function of, including or derived from propagation delay related parameter/information.

DETAILED DESCRIPTION

Example Networks for Implementation of the Embodiments

As previously noted, embodiments may be implemented in a WTRU, a robotic vehicle, car, IoT gear, any device that moves, or other communication device, which, in turn, may be used in a communication network. The following section provides a description of some exemplary WTRUs and/or other communication devices and networks in which they may be incorporated.

Figure 1A:
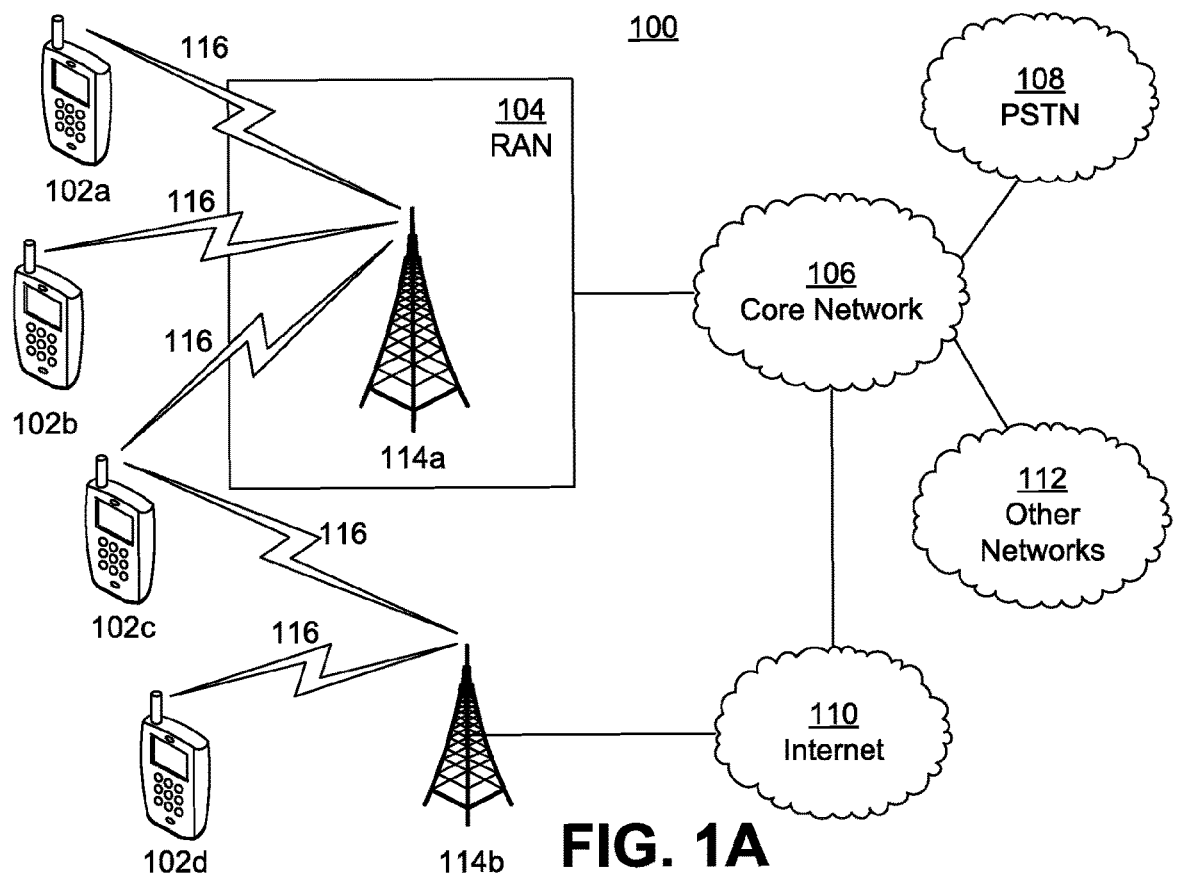
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figures 1B, 7:
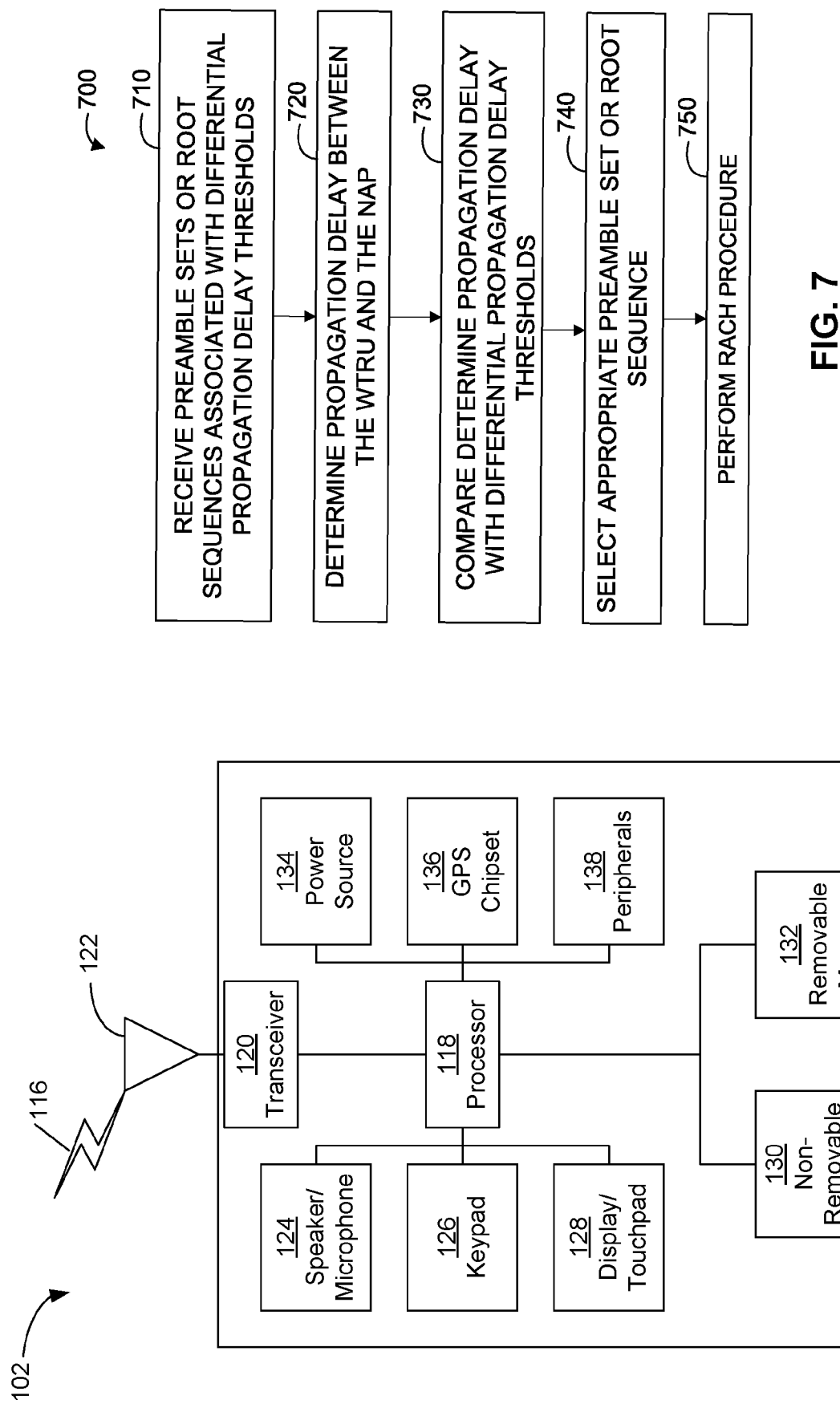
FIG. 1B is a system diagram illustrating an example wireless transmit/receive unit (WTRU) that may be used within the communications system illustrated in FIG. 1A according to an embodiment.
FIG. 7 is flowchart illustrating a representative procedure to perform a RACH procedure.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
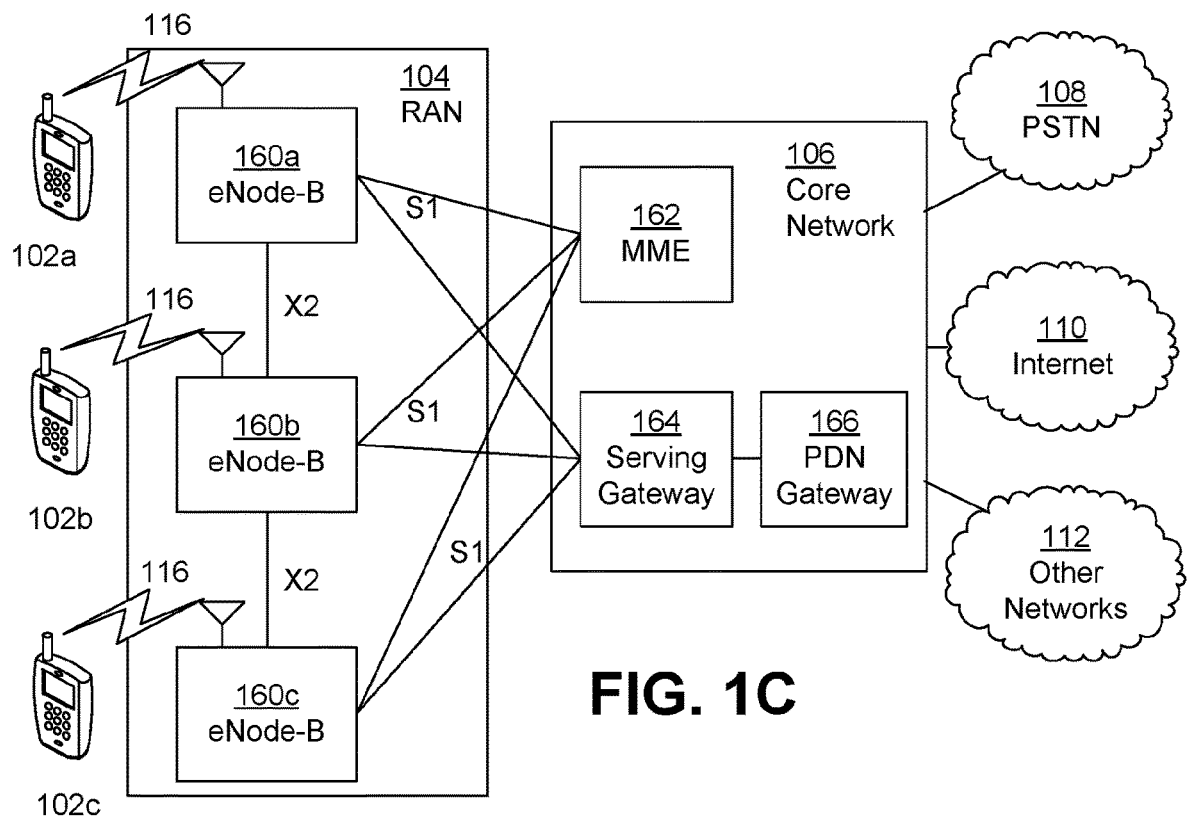
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 1C, the eNode Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
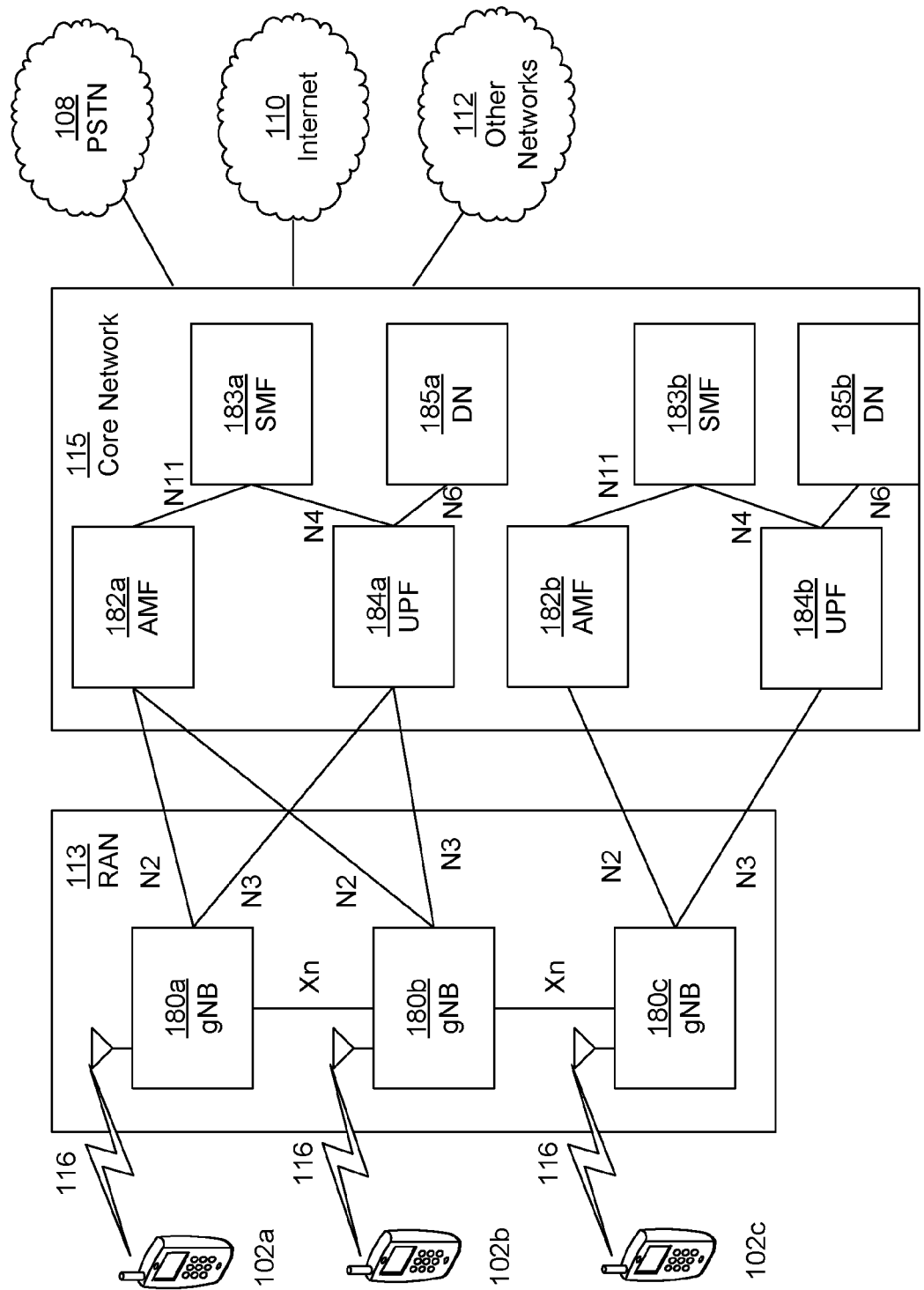
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode Bs 160a, 160b, 160c. For example, WTRUs 102a, 102b, 102c may implement DC principles to communicate with one or more gNBs 180a, 180b, 180c and one or more eNode Bs 160a, 160b, 160c substantially simultaneously. In the non-standalone configuration, eNode Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of Non-Access Stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In certain representative embodiments, methods, system, apparatus operations, functions and/or procedures may be implemented to enable distance dependent RACH preamble groupings (e.g., using propagation delay related information (e.g., (1) an absolute propagation delay, (2) relative propagation delay, for example which may be a propagation delay difference relative to the nadir, (3) a distance from a WTRU to its NAP, and/or (4) a distance from the WTRU to a nadir or the NAP), among others.

In certain representative embodiments, methods, system, apparatus operations, functions and/or procedures may be implemented to enable a selection of a RACH root sequence for determining a RACH preamble (e.g., using propagation delay related information (e.g., (1) an absolute propagation delay, (2) relative propagation delay, for example which may be a propagation delay difference relative to the nadir, (3) a distance from a WTRU to its NAP, and/or (4) a distance from the WTRU to a nadir or the NAP), among others.

In certain representative embodiments, methods, system, apparatus operations, functions and/or procedures may be implemented to enable an RA-RNTI as a function of, derived from or including the propagation delay related information.

Representative Procedures for Distance Dependent Random Access Response (RAR) Decoding Satellite systems play a part (e.g., an invaluable part) in enabling communications, for example in places where the last mile of fiber cable or terrestrial WTRU telephony is unviable. Satellite services may be considered supplementary to terrestrial cellular and land-based communication systems. Satellite services have historically facilitated broadcast applications such as television and provided emergency, essential services to offshore oil-rigs and shipping industries. Satellites may provide broadband (e.g., true broadband) connectivity to terrestrial users complementing land-based WTRU and fixed wireless systems. The volume of users utilizing satellite based services is limited to those (e.g., just those) who can afford the services or who have no other alternatives. For Satellites to become a pervasive and viable technology, the volume of users that can be supported should increase and unicast services in addition to existing broadcast services should become more prevalent. With an increase in user count, the volume of data serviceable may increase almost linearly.

Satellites may occupy one of several orbital classes. In the low earth orbit (LEO) class, satellites are typically at altitudes of about 400 to 2,000 kilometers with a common altitude of about 700 kilometers. In the medium earth orbit (MEO) class, satellites are typically at altitudes of about 2000 to 32,000 kilometers with a common altitude of about 20,000 kilometers. In the geo-synchronous (GSO) or geo-stationary orbit (GEO), the satellites may be quasi-fixed at approximately 36,000 kilometers. With higher altitudes, propagation delay and power budgets may be the issue (e.g., the main issue) while with lower altitudes, doppler and mobility may be the issue (e.g., the main issue). With lower orbits, the satellites experience atmospheric drag and per Kepler's laws of planetary motion, the lower the orbital altitude, the higher the angular velocity of the satellite.

To dimension systems with good and/or acceptable link budgets, it is likely that commercial communications satellites may be either LEO or MEO in the medium term and on very high frequencies. With very high velocity satellites, the doppler may be very high and this may pose issues with synchronization and time for fix. Satellite link budgets may be provided (e.g., built) with high link margins to overcome rain and/or other atmospheric aberrations that may arise during a communication. Despite this, the Signal-to-Interference-Plus-Noise Ratio (SINR) experienced and/or measured on the downlink and/or the uplink may be low (e.g., low enough) that, for example the highest modulation-coding schemes employed in satellite links may be several orders lower than what is comparable in terrestrial systems. The long propagation delays involving satellite links may be several orders larger than observed in a terrestrial system. The long propagation delays may pose issues enforcing efficient power control loops, which may cause the satellite terminals and ground stations to perform with incorrectly set operating points.

Satellite links, though reliable, may suffer from high latencies. Services that use TCP as the transport layer may be susceptible (e.g., especially susceptible) to latency and performance may degrade accordingly.

Representative Procedures for RRC Connection Establishment from IDLE

FIG. 2 is a diagram illustrating a representative RRC connection establishment procedure. Referring to FIG. 2, in the RRC connection procedure 200, the WTRU 102 may enter RRC connected state after a 4-way signaling exchange of information. For example, at 220, system information may be broadcast from an eNodeB, a gNB 180, a satellite S, a base station (BS), a ground station 310B (for example, collectively referred to a Network Access Point (NAP) 210). At 230, the WTRU 102 may perform DL synchronization and may read the master information and/or system information blocks to determine the viability of the system. The WTRU 102 may estimate the open loop transmit power to be used and/or required after measuring a candidate cell's reference signal or pilot signal received power and an advertised DL transmit power. At 240, the WTRU 102 may transmit Message 1 (MSG1) to the NAP 210 that may include a RACH preamble (e.g., using, masked and/or scrambled by a Random Access-Radio Network Temporary Identifier (RA-RNTI). At 250, the NAP 210 may detect the RACH preamble and may determine a Timing Advance (TA) estimation. At 260, the NAP may transmit to the WTRU 102 a Message 2 (MSG2). The MSG2 may include or may indicate a TA, a power correction, an UL grant and/or a temporary Cell Radio Network Temporary Identifier (T-CRNTI), among others. At 270, the WTRU 102 may transmit to the NAP 210, a Message 3 (MSG3). The MSG3 may include or may indicate a RRC connection request and a WTRU ID. At 280, the NAP 210 may transmit to the WTRU 102 a Message 4 (MSG4). The MSG4 may include a contention resolution (e.g., a contention resolution indication).

In certain representative embodiments, the RA-RNTI may be established as a function of, derived from or may include a propagation delay related parameter or propagation delay related information.

In certain representative embodiments, the preamble sent in MSG1 may be selected based on a propagation delay related parameter or propagation delay related information.

For example, the NAP 210 may broadcast a CAZAC root sequence index and any cyclic shift restrictions that may apply in a cell. The WTRU 102 may generate a plurality of preambles (e.g., 64 preambles) using the CAZAC root sequence and/or additional CAZAC root sequences, for example depending on the cyclic shift restrictions that may apply in the cell. The WTRU 102 may select one preamble from among a superset of preambles available and may transmit the sequence (e.g., in the MSG1) at a power level determined by an open loop setting (e.g., based on the open loop estimation). If the NAP 210 received and estimated the preamble correctly, the NAP 210 may determine the amount of shift in the received preamble and the associated propagation delay. The NAP 210 may convert the propagation delay into a TA and may determine if the WTRU 102 needs to and/or is to perform any power correction.

FIG. 3 is a diagram illustrating a representative NTN showing a variance in propagation delay inside a spot-beam.

Referring to FIG. 3, for a NTN 300, the NAP 210 may be on an orbit several hundreds to several thousands of kilometers (kms) above earth. For example, if a NTN NAP 210 is determined to be on a circular orbit of 3,000 km above earth, the one-way propagation delay is about 10 milliseconds to the nadir on earth. In FIG. 3 $D_A$ may equal 3000 km and may represent the distance to the nadir and Terminal A (e.g., a WTRU 102A and/or a ground station 310A) may be at located at the nadir. Terminal A may experience a one-way propagation delay of about 10 ms. If the minimum serviceable elevation angle is 45 degrees, and Terminal B (e.g., another WTRU 102B and/or a ground station 310B) is at an edge of the spot beam 320 and corresponds to an elevation angle θ (e.g., an elevation angle θ of 45 degrees), using Pythagorean theorem, Terminal A 102A/310A and Terminal B 102B/310B can be separated by 3,000 km. For this example, the curvature of the earth has been discounted (e.g., not considered) and the earth may be assumed to be a flat surface. The distance $D_B$ between the Terminal B 102B/310B and the NAP 210 may be equal to 4242.6 km and the one-way propagation delay over the distance $D_B$ equals about 14.14 milliseconds. There may be a large variation in propagation delay within the spot beam 320 (e.g., in a range between 10 ms and 14.14 ms for the example shown in FIG. 3. This variance may increase as the minimum elevation angle decreases. Typically, satellites/NTN NAPs 210 can have a serviceable elevation angle as low as, for example about 10 degrees.

Figure 4:
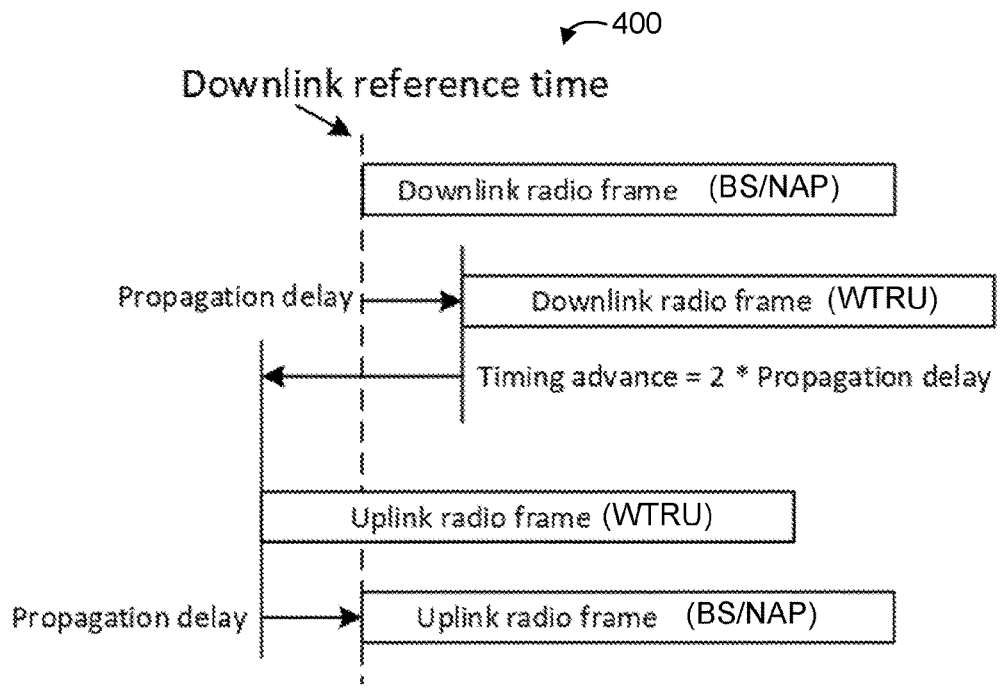
FIG. 4 is a diagram illustrating a representative timing advance procedure.

FIG. 4 is a diagram illustrating a representative TA procedure.

Referring to FIG. 4, the TA procedure 400 may include the WTRU 102 performing (e.g., first performing) downlink synchronization with a BS and/or NAP 210 before performing network access (e.g., any network access). For example, the uplink and downlink radio frames may be synchronized based on the propagation delay. The TA for the WTRU 102 may be set to 2*the propagation delay.

For example, on the uplink, the BS/NAP 210 may expect to receive all transmissions from scheduled WTRUs 102 (e.g., all scheduled WTRUs 102) for a specific interval (e.g., transmission time interval (TTI)) to be time aligned as shown in FIG. 4. To compensate for a variance in propagation time for the various WTRUs 102 in the coverage area (e.g., spot coverage area), the BS/NAP 210 may inform the WTRUs 102 (e.g., each WTRU 102) of Timing Advance (TA) information (e.g., a TA value). The TA value may be the time-unit by which a WTRU 102 advances its uplink transmission so that its uplink frame arrives time-aligned with other uplink transmissions from other WTRUs 102. A variation (e.g., large variation and/or a variation that is above a threshold) in propagation delay within the spot beam 320 may cause the NAP 210 (e.g., the satellite or other aerial device) to falsely detect a received preamble. Representative procedures to address this false detection may be realized by applying cyclic shift restrictions. Such procedures may increase the processing load at the BS/NAP 210.

In certain representative embodiments, methods, systems, apparatus, operations, functions and/or procedures may be implemented to negate the propagation delay variance that would exist in such spot beams 320, for example such that the TA may be reliably estimated for a NTN BS/NAP 210.
Representative Procedures for Distance Dependent RACH Preamble Grouping FIG. 5 is a diagram illustrating a position estimation with respect to a nadir of a NTN.

Figure 5:
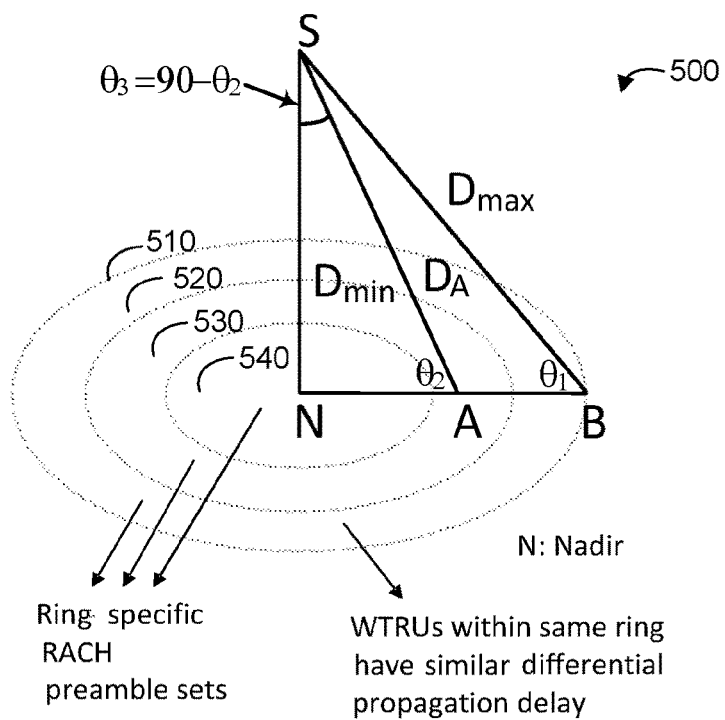
FIG. 5 is a diagram illustrating a position estimation with respect to a nadir and/or propagation delay differences in a NTN.

Referring to FIG. 5, in the NTN 500, a spot beam 510 (e.g., circular or elliptical with low eccentricity) may be split into several concentrically enclosed sub-spot beams 520, 530, 540. The center of the spot beam is the nadir of the satellite (e.g., right below the BS/NAP 210). The minimum propagation delay between the satellite/BS/NAP 210 and a WTRU 102/ground station 310 within the spot beam 510 occurs at the center (e.g., the nadir N) of the spot beam 510 (e.g., at the nadir N of the satellite/NAP 210 (located at S).

The minimum elevation angle, $\theta_1$ in FIG. 5 may be a design parameter and may be known to the satellite/NAP 210 and the WTRUs 102 in the spot beam 510. The minimum elevation angle may be signaled to the WTRUs 102 over an air interface, for example over or via system information. The position S of a satellite may be estimated by the WTRU 102 based on information broadcast in system information. For example, the absolute transmission time of a particular system information block corresponding to the {SFN, SF} in which it is transmitted may be included as Coordinated Universal Time (UTC) in the system information. It is contemplated that based on a difference between the received and transmitted timestamps, the WTRU 102 may estimate the propagation delay to the satellite/NAP 210 while at position S. From two or more such transmissions from the satellite/NAP 210 while at positions S(t), S(t+Δt), S(t+2Δt), ... S(t+2nΔt) (e.g., where n is an integer number), the WTRU 102 may determine a distance and/or a trajectory of the satellite/NAP 210 based on periodic reception of such information. In certain representative embodiments, the satellite/NAP 210 may broadcast its GNSS coordinates, for example periodically as part of the system information.

A WTRU 102 at an arbitrary position A within the spot beam 510 may estimate a position S of the satellite (e.g., NAP 210) and the distance $D_A$ to the position S of the satellite/NAP 210 and/or a corresponding interior angle $\theta_2$ the WTRU 102 makes with the satellite/NAP 210. Since point N is the nadir of the satellite/NAP 210 (e.g., which refers to the perpendicular from point S to point N), the complementary angle $\theta_3$ may be determined. With a determination of the angles $\theta_2$ and/or $\theta_3$ that point A forms with S and the hypotenuse $D_A$ (which may be the propagation distance), the distance between point A and N, $\overline{AN}$ and/or the distance from S and N, $\overline{SN}=D_{min}$ may be determined. The associated propagation delays to cover distances $D_{min}$ and/or $D_A$ may be determined.

For example, it is contemplated that a variation in one-way propagation delay may exist for values (e.g., for all continuous values) between distance $D_{min}$ and distance $D_{max}$. If two WTRUs 102, one at point N and the other at point B, choose (for example via a uniformly and random selection procedure) and transmit an identically shifted CAZAC cyclic sequence, the NAP 210 in position S may falsely detect one of the preambles due to the large variance between these distances (e.g., distance $D_{min}$ and distance $D_{max}$). The same outcome may be true for any two WTRUs 102, one a first position (e.g., at position N) inside the spot beam 510 and the other at any arbitrary position A inside the spot beam 510. Without loss of generality, the problem with varying magnitude (e.g., varying propagation delay timing) may exist for any two or more WTRUs 102 at arbitrary positions A, $A^1$ etc. within the spot beam 510. The problem may be less emphasized when the distance between A, $A^1$ is relatively short (e.g., less than a threshold difference in propagation delay) and the problem may be more emphasized more when the distance between A and $A^1$ is relatively large (e.g., more than the threshold difference in propagation delay).

In certain representative embodiments, a WTRU 102 at position A may be instructed to determine its relative distance to point N and depending on the distance to point N, the WTRU 102 may select (e.g., may be forced to select) from a subset of available preambles. For example, the propagation delay difference, $\delta_A$, for a WTRU 102 at point A compared with the minimum propagation delay $D_{min}$ may be set forth in Equation 1, as follows.

$$\delta_A = \frac{D_A - D_{min}}{\text{speed of light}} \quad (1)$$

The total set of preambles {P} available in a spot beam 510 may be split into T orthogonal sets conforming to properties set forth in Equations 2 and 3, as follows.

$$\{P_1\},\{P_2\}, \ldots ,\{P_T\}|\{P_I\}\cap\{P_J\}=(\emptyset); \quad (I,J)\in \{1,2,\ldots,T\} \text{ and } I\neq J \quad (2)$$

$$\{P_1\}\cup\{P_2\}\cup\{ \ldots \}\cup\{P_T\}=\{P^1\}\subset\{P\} \quad (3)$$

The size of each subset may be different and may or may not be equal, (e.g., the number of preambles in one subset $P_I$ may be equal to or more or less than $P_J$). It is contemplated that $P_1$ is a subset or a proper-subset of P, e.g., some of the subsets may not be used by the BS/NAP 210, if the BS/NAP 210 chooses/determines and/or may be reserved for dedicated usage. The WTRUs 102 may be signaled to choose/determine a preamble from the specific subset $P_I$, $I \in \{1, 2, \ldots, T\}$ based on the formulation set forth in Equation 4.

$$\text{Preamble} = \text{Uniformly random} \begin{cases} \text{Select from } P_1 \text{ if } \delta_A < THR_1 \\ \text{Select from } P_2 \text{ if } THR_1 \leq \delta_A < THR_2 \\ \text{Select from } P_3 \text{ if } THR_2 \leq \delta_A < THR_3 \\ \ldots \\ \text{Select from } P_T \text{ if } THR_{T-1} \leq \delta_A \end{cases} \quad (4)$$

The WTRU 102 may estimate distance $D_{min}$ and/or distance $D_A$ without ambiguity (e.g., any ambiguity). The propagation delay difference $\delta_A$ may be estimated from Equation 1. Depending on the threshold value of the propagation delay difference $\delta_A$, the WTRU 102 may select the preamble using Equation 4 and may transmit the preamble to the NTN (e.g., the NAP 210). In certain representative embodiments, since NTN knows that the WTRU 102 is to choose a preamble from a subset of preambles (e.g., a randomly selected preamble from only a subset of given preambles associated with the position A of the WTRU 102 in the spot beam 510) based on its relative position to the nadir (e.g., the point N), there is no confusion about the impact of differential propagation delay in the received shifted sequence.

In one embodiment, the WTRU 102 may be preconfigured to automatically determine the preamble subsets and associated propagation delay difference thresholds if not signaled explicitly by the gNB 180/NAP 210 (e.g., a network entity). For example, a procedure may be implemented to enable the WTRU 102 to have the preamble subsets and associated thresholds be preconfigured in the mobile equipment (ME) and/or the Universal Subscriber Identity Modules (USIM). The procedure may enable the WTRU 102 to be configured (e.g., at the WTRU 102) by a network entity (e.g., a gNB 180 and/or a NAP 210) via an application layer over any communication media. The gNB 180 may signal a parameter, for example PREAMBLESET_INDICATOR, via the system information or via dedicated signaling to the WTRU 102. The PREAMBLESET_INDICATOR may instruct the WTRU 102 on how to determine the preamble subsets and associated thresholds. The PREAMBLESET_INDICATOR, for example, may be a scalar value encoding an integer or a bit-string, although other formats are also possible and not precluded.

As one example, PREAMBLESET_INDICATOR=1 may indicate the WTRU 102 to select Procedure#{1} in its stored memory. Procedure#{1} may pre-define splitting 64 preambles into 8 equal sets $\{P_1, P_2, \ldots P_8\}$ of 8 preambles each. Procedure#{1} may map $\{P_1, P_2, \ldots P_8\}$ to thresholds $\{THR1=500~\mu s, THR2=900~\mu s, \ldots THR8=4800~\mu s\}$. The definition included in and/or contained in Procedure#{1} may be known a priori at the WTRU 102 and the gNB 180/NAP 210. The WTRU 102 may be preconfigured with U procedures (e.g., U different procedures), Procedure#{1, 2, U} with each Procedure#{I}, $I \in \{1, 2, \ldots, U\}$, representing a particular way of forming preamble sets and deriving the corresponding delay difference thresholds. In certain representative embodiments, the values selected for the thresholds may correspond to distances of the WTRU 102 from the nadir N. One of skill understands that any threshold THR1, THR2 . . . THRN may correspond to a value set in accordance with propagation delay range associated with a WTRU that is located within the spotbeam. The thresholds THR1, THR2 . . . THRN may change based on satellite/NAP orbit/aerial path above earth's surface and beam coverage.

Representative Procedures for Selection of Distance Dependent RACH Root Sequence In certain representative embodiments, the gNB 180/NAP 210 may choose and/or determine to apply different RACH root sequences to the WTRUs 102 based on a location of the WTRUs 102. If the gNB 180/NAP 210 chooses/determines to operate T RACH root sequences with root sequence indices $\{R_1, R_2, \ldots, R_T\}$. The WTRU 102 may be signaled to choose/select a root sequence index $R_I$, $I \in T$ based on the formulation set forth in Equation 5.

$$\text{Root index} = \begin{cases} R_1 \text{ if } \delta_A < THR_1 \\ R_2 \text{ if } THR_1 \leq \delta_A < THR_2 \\ \ldots \\ R_T \text{ if } THR_{T-1} \leq \delta_A \end{cases} \quad (5)$$

The WTRU 102 may estimate distance $D_{min}$, distance $D_A$ and/or propagation delay (e.g., propagation delay difference) $\delta_A$. Depending on the threshold value of the propagation delay difference $\delta_A$, the WTRU 102 may select the RACH root sequence index using Equation 5.

Subsequent to the selection of the root sequence index, the WTRU 102 may generate a length Q CAZAC sequence. For example, Q may be set to 837 for NR and/or LTE. The WTRU 102 may generate 64 cyclically shifted preambles with the given root. The WTRU 102 may uniformly and randomly select a preamble and may transmit the selected preamble to the NTN 300/500. The WTRU 102 may exclude from the 64 preambles any preambles reserved for dedicated use. The preambles reserved for dedicated use may be signaled to the WTRU 102 by the gNB 180/NAP 210, for example in system information or via RRC dedicated signaling. The gNB 180/NAP 210 may determine and/or choose to apply cyclic shift restrictions, as appropriate, for various representative embodiments.

In certain representative embodiments, additional root sequence indices may be determined, for example based on a primary RACH root sequence index $R_I$, IÅT selected in Equation 5. For example, the WTRU 102 may be preconfigured to automatically determine the RACH root sequence set and associated propagation delay difference thresholds if not signaled explicitly by the gNB 180/NAP 210. The primary RACH root sequence index may be (e.g., may always be) signaled to the WTRU 102. The WTRU 102 may be configured with a procedure a priori (e.g., preconfigured) in the ME/USIM on how to determine the RACH root sequence set and/or associated thresholds. The procedure may be configured at the WTRU 102 by the network via the application layer over any communication media. The gNB 180/NAP 210 may signal a parameter, for example RSISET_INDICATOR, via system information and/or via dedicated signaling to the WTRU 102. The RSISET_INDICATOR parameter may instruct the WTRU 102 on how to determine the RACH root sequence set and/or associated thresholds. The RSISET_INDICATOR parameter, for example, may be a scalar value encoding an integer or a bit-string though other formats are possible and are not precluded.

As one example, RSISET_INDICATOR=1 may indicate that the WTRU 102 is to select Procedure#{1} in the stored memory of the WTRU 102. Procedure#{1} may pre-define forming a set of 4 RACH root indices as follows: {$R_1$, $R_1$+A, $R_1$+B, $R_1$+C} where $R_1$ is the primary RACH root sequence index signaled via system information by the gNB 180/NAP 210 and integers {A, B, C} are predefined for Procedure#{1}. Procedure#{1} may map {$R_1$, $R_2$, $R_3$, $R_4$} to thresholds {THR1=500 μs, THR2=900 μs, . . . THR4=2000 μs}. The definition included in and/or contained in Procedure#{1} may be known a priori at the WTRUs 102 and the gNB 180/NAP 210 (e.g., the BS). The WTRU 102 may be preconfigured with U procedures (e.g., U different procedures), Procedure#{1, 2, . . . U} with each Procedure#{I}, IÅ{1, 2, . . . , U}, representing a particular way of forming RACH root sequence sets and/or deriving the corresponding delay difference thresholds.

Representative Procedures for Determination of Sub-Spot Beams

The sub-spot beams 520, 530, and 540 (e.g., annual rings) (for example may be defined by and/or set based on differential propagation delays δ estimated using the formula in Equation 1 (and/or using a formula that also takes into account the curvature of the Earth and/or the altitude of the WTRU 102). Depending on the exact differential propagation delay δ and/or the associated threshold settings, the WTRU 102 may select a RACH preamble set and/or a RACH root sequence.

In certain representative embodiments, the satellite/NAP 210 may employ differential distance thresholds ψ. For example, the WTRU 102A may have a GNSS receiver allowing it to estimate its position ($X_A$, $Y_A$) on a coordinate plane (e.g., where (X, Y) refer to the latitude and longitude). The nadir of the satellite/NAP 210 may be estimated by the WTRU 102A (e.g., at location A) as ($X_N$, $Y_N$) using procedures described herein. The distance $\psi_A = \sqrt{(X_A^2 - X_N^2) + (Y_A^2 - Y_N^2)}$ refers to the distance between the WTRU 102A and the nadir N of a satellite/NAP 210. The satellite/NAP 210 may choose and/or determine to define sub-spot beams 520, 530 and 540 based on differential distances using the nadir N as a reference. In this case, Equation 4 may be modified to Equation 6, which is set forth as follows.

$$\text{Preamble} = \text{Uniformly random} \begin{cases} \text{Select from } P_1 & \text{if } \psi_A < DistTHR_1 \\ \text{Select from } P_2 & \text{if } DistTHR_1 \leq \psi_A < DistTHR_2 \\ \text{Select from } P_3 & \text{if } DistTHR_2 \leq \psi_A < DistTHR_3 \\ \ldots \\ \text{Select from } P_T & \text{if } DistTHR_{T-1} \leq \psi_A \end{cases} \quad (6)$$

where the specific subset $P_I$, I∈ {1, 2, . . . , T}, are defined earlier and the $DistTHR_I$, I∈ {1, 2, . . . , T}, are the distance thresholds with respect to the nadir. For example, if the satellite chooses and/or determines to assign different root sequences to the sub-spot beams (e.g., sub-spot beams 520, 530 and 540), Equation 5 may be modified to Equation 7, which is set forth as follows.

$$\text{Root index} = \begin{cases} R_1 & \text{if } \psi_A < DistTHR_1 \\ R_2 & \text{if } DistTHR_1 \leq \psi_A < DistTHR_2 \\ \ldots \\ R_T & \text{if } DistTHR_{T-1} \leq \psi_A \end{cases} \quad (7)$$

FIG. 6 is an overall flowchart illustrating a representative procedure for selection of distance dependent RACH preambles in an NTN. Certain procedures set forth herein uses portions of this representative procedure 600. Referring the FIG. 6, the representative procedure may include, at block 605, the WTRU 102 obtaining preamble subsets, root sequence sets, propagation delay thresholds (e.g., propagation delay differential thresholds) from the ME and/or the USIM, on condition that such information is broadcast in SI and/or RRC signaled. Alternatively, at block 610, the WTRU 102 may use default/predetermined information associated with the preamble subsets, the root sequence sets, propagation delay thresholds, on condition that such information is not broadcast in the SI and/or RRC signaled.

At block 615, the WTRU may read an absolute transmission (TX) time of the SI in the UTC. At block 620, the WTRU 102 may determine the satellite/NAP 210 position and/or the nadir of the satellite/NAP 210. At block 625, the WTRU 102 may determine a current position of the WTRU 102. At block 630, the WTRU 102 may determine any of: (1) a relative distance (e.g., from the WTRU 102 to the satellite/NAP 210 or from the WTRU 102 to the nadir N) associated with the satellite/NAP 210 and/or (2) a relative propagation delay associated with the satellite/NAP 210 based on the absolute TX time. At block 635, on condition that the WTRU 102 determines a relative delay, the WTRU 102 may determine a differential propagation delay. At block 640, on condition that the WTRU 102 determines a relative position, the WTRU 102 may determine a distance to the nadir. At block 645, the WTRU 102 may determine whether to select preamble subsets or root sequence sets. At block 650, on condition that preamble subsets are selected at block 645, the WTRU 102 may compare: (1) the determined propagation delay or differential propagation delay to propagation delay thresholds; and/or (2) the determined relative distance to distance thresholds. Based on this comparison, the WTRU 102 may select a preamble subset. The WTRU 102 may randomly select a preamble from the selected preamble subset.

At block 655, on condition that root sequence sets are selected at block 645, the WTRU 102 may compare: (1) the determined propagation delay or the determined differential propagation delay to propagation delay thresholds; and/or (2) the determined relative distance to distance thresholds. Based on this comparison, the WTRU 102 may select a root sequence set. The WTRU 102 may: (1) randomly select a preamble from the selected root sequence set; or (2) randomly select a preamble from a defined subset of the preamble sets (the defined subset being selected based on, for example propagation delay related information). At block 660, the WTRU 102 may initiate a RACH procedure and may enter connected mode. At block 665, the WTRU 102 may receive RRC signaling. Processing may move to 605 to establish one or more further connections.

Representative Procedure for Physical RACH (PRACH) Masking Based on Relative Distance (e.g., Distance to Nadir)

The gNB 180/NAP 210 may employ several RACH occasions per duty cycle. For example, the gNB 180/NAP 210 may employ a total of R RACH opportunities, for example every duty cycle (e.g., every 20 ms, evenly or unevenly spread within the 20 ms duty cycle). In certain embodiments, the gNB 180/NAP 210 may restrict access for the WTRUs 102 in a specific geography within the spot beam 510 to one or more RACH opportunities but not all possible R RACH opportunities. More generally, the gNB 180/NAP 210 may configure restrictions access for the WTRUs 102 in a specific geography (e.g., based on the propagation delay (e.g., calculated S as in Equation 1 or based on distance to the nadir N within the spot beam) to one or more RACH resources within all possible R RACH resources.

For example, the gNB 180/NAP 210 may determine that the WTRUs 102 within a distance of $DistTHR_1$ from the nadir may use the $1^{st}$ RACH opportunity (e.g., only the $1^{st}$ RACH opportunity) within the duty cycle, The WTRUs 102 within a distance of $DistTHR_2$ from the nadir and further than $DistTHR_1$ from the nadir may use the $2^{nd}$ RACH opportunity (e.g., only the $2^{nd}$ RACH opportunity) within the duty cycle, and so on. In another example, the gNB 180/NAP 210 may determine that WTRUs 102 within a distance of $DistTHR_1$ from the nadir may use a given RACH resource with a specific frequency domain aspect (e.g., a specific PRB allocation, a specific f_id, and/or a specific bandwidth part), and the WTRUs 102 within a distance of $DistTHR_2$ from the nadir and further than $DistTHR_1$ from the nadir may use a RACH resource with a different frequency domain aspect, and so on. Similar to the details earlier in the disclosure, the gNB 180/NAP 210 may employ distance thresholds ψ (e.g., differential or absolute distance thresholds). The WTRU 102A may have a GNSS receiver allowing the WTRU 102A to estimate its position $(X_A, Y_A)$ on the coordinate plane where (X, Y) refer to the latitude and longitude of the WTRU 102A. The nadir of the satellite S/NAP 210 may be estimated by the WTRU 102A as $(X_N, Y_N)$ using procedures described herein. The distance $\psi_A = \sqrt{(X_A^2 - X_N^2) + (Y_A^2 - Y_N^2)}$ refers to the distance between the WTRU 102A and the nadir N of the satellite/NAP 210.

The gNB 180/NAP 210 may apply one or more PRACH masks to the duty cycle and may map the masks (e.g., each mask) to distance thresholds (e.g., a distance threshold range) and may signal the distance threshold ranges via SI, RRC signaling and/or multicasting. The WTRU 102A may select the RACH opportunity based on a distance $\psi_A$ of the WTRU 102A with respect to the nadir. An example is set forth in Equation 8, as follows.

$$WTRU\ RACH\ opportunity = \begin{cases} \text{PRACH MASK \#1} & \text{if } \psi_A < DistTHR_1 \\ \text{PRACH MASK \#2} & \text{if } DistTHR_1 \le \psi_A < DistTHR_2 \\ \text{PRACH MASK \#3} & \text{if } DistTHR_2 \le \psi_A < DistTHR_3 \\ \quad \cdots \\ \text{PRACH MASK \#R} & \text{if } DistTHR_{R-1} \le \psi_A \end{cases} \quad (8)$$

Alternately, a RACH opportunity may be as set forth in Equation 9, as follows:

$$WTRU\ RACH\ opportunity = \begin{cases} \text{PRACH MASK \#1} & \text{if } \delta_A < THR_1 \\ \text{PRACH MASK \#2} & \text{if } THR_1 \le \delta_A < THR_2 \\ \text{PRACH MASK \#3} & \text{if } THR_2 \le \delta_A < THR_3 \\ \quad \cdots \\ \text{PRACH MASK \#R} & \text{if } THR_{R-1} \le \delta_A \end{cases} \quad (9)$$

Representative Procedure for Decoding RAR Based on Relative Distance (e.g., Distance to the Nadir)

In certain representative embodiments, an RA-RNTI may be made dependent on (e.g., may be based on) a propagation delay related parameter/information, for example a distance from the WTRU 102 to the nadir. The computation of the RA-RNTI formula may consider (e.g., include and/or be a function of) the distance or the differential distance as part of the computation. For example, the RA-RNTI of a cell may be a function of $t_{id}$ (the index of the sub-frame, where $0 \le t_{id} < 10$), $f_{id}$ (the index of the specified PRACH within that sub-frame, where $0 \le f_{id} < 6$), differential propagation delay $\delta_A$, and/or differential distances ($\psi_A$). An example assignment may be:

$$RA\text{-}RNTI = f(t_{id}, f_{id}, \delta_A, \psi_A)$$

where $f$ is any function.

In an example, the RA-RNTI may be formulated (e.g., more generally formulated), as follows in Equation 10 or 11:

$$RA\text{-}RNTI = \begin{cases} RNTI_1 & \text{if } \delta_A < THR_1 \\ RNTI_2 & \text{if } THR_1 \le \delta_A < THR_2 \\ \quad \cdots \\ RNTI_T & \text{if } THR_{T-1} \le \delta_A \end{cases} \quad (10)$$

$$RA\text{-}RNTI = \begin{cases} RNTI_1 & \text{if } \psi_A < DistTHR_1 \\ RNTI_2 & \text{if } DistTHR_1 \le \psi_A < DistTHR_2 \\ RNTI_3 & \text{if } DistTHR_2 \le \psi_A < DistTHR_3 \\ \quad \cdots \\ RNTI_R & \text{if } DistTHR_{R-1} \le \psi_A \end{cases} \quad (11)$$

The WTRUs 102 may use the appropriate RA-RNTI to decode the RAR. Encoding the distance, as a part of the RA-RNTI, may be useful for the gNB 180/NAP 210 to address a given WTRU 102 when a preamble collision happens, for example, when the same preamble/preamble set is provided in more than one sub-spot beam 520, 530 and 540.

Referring back to FIG. 5, any WTRU 102 in an inner most sub-spot or ring 540 (e.g., a WTRU 102 at position N or in the vicinity of the nadir) may expect a Physical Downlink Control Channel (PDCCH) of the WTRU 102 at the position N to be scrambled by $RNTI_1$ and any WTRU 102 in an outermost most sub-spot or ring 520 (e.g., a WTRU 102 at position B or in the vicinity of position B) may expect a PDCCH of the WTRU 102 at position B to be scrambled by $RNTI_2$, where $RNTI_1 \ne RNTI_2$. The WTRU 102 in the inner most sub-spot/ring 540 may use $RNTI_1$ to decode its PDCCH and the WTRU 102 in the outermost sub-spot/ring 520 may use $RNTI_2$ to decode its PDCCH. It is contemplated that this approach does not require different preamble sequences and/or different preamble sets to be used by the WTRUs 102 in different rings. In certain representative embodiments, a set of sequences may be shared by the WTRUs 102 (e.g., all of the WTRUs 102 in a spot beam (e.g., similar to how it is shared by the WTRUs 102 in a terrestrial cell). In other representative embodiments, the set of sequences may be different for various portions of the spot beam 510. In certain schemes, the WTRUs 102 may be required to determine (e.g., only determine) propagation delays or differential propagation delays $\delta_A$, (as in Equation 1) or distances or differential distances $\psi_A$ to know/determine, which RA-RNTI the WTRU 102 may use and/or may need to use. Such a scheme may decrease time wasted due to collisions, as the PDCCHs may be scrambled by different RNTIs for WTRUs 102 in different rings/annulus, for example to avoid collisions.

Although the areas of the spot beam 510 are divided into sub-spots 520, 530 and 540, as different rings, annulus, other divisions are possible such as sectioned rings. For example, the outmost sub-spot 520 may be further divided into any number of sections (e.g., half sections, quarter sections or sixth section, among others). A different RNTI may be used to scramble PDCCHs of WTRUs located in a particular section. The division of the spot beam 510 may be based on the number of WTRUs estimated for the particular division and may be semi-static or dynamically adjusted via broadcast information and/or RRC signaling.

In certain representative embodiments, the WTRU 102 may determine whether a RAR (e.g., a MSG2) transmission is applicable based on the content of the RAR. For example, the content of the RAR may include a given distance or a differential distance, where WTRUs 102 falling within such geographical area may be considered applicable. This may be an alternative to changing the RA-RNTI format, while targeting certain WTRUs 102 within a subset of the coverage of the spot beam 510.

Representative RACH Procedure to Correct Mis-Estimation of Differential Propagation Delay/Distance If a WTRU 102 miscalculates and/or incorrectly determines the propagation delays/distance (e.g., differential propagation delays/distance) ($\delta_A$, $\psi_A$), an incorrect preamble sequence may be chosen and/or selected. For example, the WTRU 102 may have selected a preamble from a first preamble set (and/or first root sequence) belonging and/or corresponding to a first partition (e.g., a first region 540 of the spot beam 510, when the WTRU 102 should have selected a second preamble from a second preamble set due to the miscalculation of the propagation delays/distance (e.g., differential propagation delay/distance) (for example, the WTRU 102 being in a different, second partition (e.g., a second region 530 of the spot beam 510) than the first partition such as a different geographical area that corresponds the second preamble set). Since an RA-RNTI may be dependent on the propagation delays/distance (e.g., differential propagation delay/distance), any of the following may be performed by the WTRU 102:

1) without waiting for the RAR (that corresponds to the RACH sequence transmitted from the first preamble set) in the RAR window, the WTRU 102 may retransmit MSG1 with a sequence from the correct preamble set (e.g., from the second preamble set);

2) the WTRU 102 may ignore the RAR that may have been received using the RNTI corresponding to the first preamble set, and may not proceed (i) in monitoring the PDCCH for the selected preamble (and/or the RA-RNTI) on which the distance to nadir/propagation delay was miss-estimated, and/or (ii) in sending the MSG3 for that preamble transmission; and/or 3) the WTRU 102 may monitor the RAR corresponding to the sequence chosen from the second preamble set (e.g., the sequence from the correct preamble set), and may proceed with the MSG3, and MSG4 once the MSG2 is received. (for example, in certain embodiments a two-step RACH may be possible in which MSG1/MSG3 may be sent by the WTRU 102 simultaneously or essentially simultaneously and MSG2/MSG4 may be received by the WTRU 102 simultaneously or essentially simultaneously. The procedure may proceed normally using the preamble selected from the correct preamble set (e.g., the second preamble set), among others. For example, for 2-step RACH, the WTRU 102 may transmit MSG1+MSG3 of second preamble set and may ignore MSG2+MSG4 of first preamble set. The WTRU may, instead, wait for MSG2+MSG4 of second preamble set.

The WTRU 102 may perform any of the above provided a certain period (or timer) has not expired since the instance when the initial preamble was transmitted (e.g., the preamble on which the distance to the nadir and/or propagation delay was miss-estimated).

In certain representative embodiments, the WTRU 102 may receive a minimum serviceable elevation angle.

In certain representative embodiments, the WTRU 102 may estimate a propagation delay to/from satellite with reference to its current position.

In certain representative embodiments, the WTRU 102 may estimate a position of a satellite S and/or NAP 210 with reference to its current position.

In certain representative embodiments, the WTRU 102 may estimate the reference propagation delay at the nadir of the satellite S.

In certain representative embodiments, the WTRU 102 may determine a difference between the propagation delay from a satellite S to a current position of the satellite and/or the propagation delay from the satellite S to a nadir of the satellite S.

In certain representative embodiments, the WTRU 102 may receive, via system information, a number of preamble sets and/or associated propagation delay difference thresholds.

In certain representative embodiments, the WTRU 102 may receive, via dedicated RRC signaling, the number of preamble sets and/or associated propagation delay difference thresholds.

In certain representative embodiments, the number of preamble sets and/or associated propagation delay difference thresholds may be different when received via System Information (SI) and via dedicated signaling.

In certain representative embodiments, the WTRU 102 may receive the preamble sets and/or the associated propagation delay difference thresholds applicable for use in any of: (1) idle mode (e.g., only when in Idle mode); (2) in Connected mode; or (3) both.

In certain representative embodiments, the WTRU 102 may apply a default preamble set and/or an associated propagation delay difference mapping configuration, if a preamble set and/or an associated propagation delay difference mapping configuration is not received via SI and/or via dedicated signaling.

In certain representative embodiments, the WTRU 102 may be configured in the ME and/or the USIM to determine whether to apply a default preamble set and/or an associated propagation delay difference map.

In certain representative embodiments, the WTRU 102 may be signaled via SI whether to apply a default preamble set and/or a default associated propagation delay difference map.

In certain representative embodiments, the WTRU 102 may configure one or more procedures in the ME and/or in the USIM to execute a scheme to determine the default preamble sets and/or the associated propagation delay difference map.

In certain representative embodiments, the WTRU 102 may receive a parameter (e.g., a PREAMBLESET_INDICATOR parameter) via SI and/or via dedicated signaling to determine the preconfigured procedure to execute for determining the default preamble sets and/or the associated propagation delay difference map.

In certain representative embodiments, the WTRU 102 may select a preamble subset, for example by comparing an estimated propagation delay difference to propagation delay thresholds signaled by the gNB 180/NAP 210.

In certain representative embodiments, the WTRU 102 may select the preamble subset, for example by comparing an estimated propagation delay difference to propagation delay thresholds provided by default from the ME/USIM.

In certain representative embodiments, the WTRU 102 may receive, via SI, a RACH root sequence set consisting of or including one or more root sequence indices and/or the associated propagation delay difference thresholds.

In certain representative embodiments, the WTRU 102 may receive, via dedicated RRC signaling, a RACH root sequence set consisting of or including one or more root sequence indices and/or the associated propagation delay difference thresholds.

In certain representative embodiments, the RACH root sequence set consisting of or including one or more root sequence indices and the associated propagation delay difference thresholds may be different when received via SI and via dedicated signaling.

In certain representative embodiments, the WTRU 102 may receive a RACH root sequence set consisting of or including one or more root sequence indices and/or the associated propagation delay difference thresholds applicable for use only when in Idle mode, only when in Connected mode or both.

In certain representative embodiments, the WTRU 102 may apply a default RACH root sequence set consisting of or including one or more root sequence indices and/or the associated propagation delay difference mapping configuration, if not received via SI.

In certain representative embodiments, the WTRU 102 may be configured, for example using the ME and/or the USIM to determine whether to apply a default RACH root sequence set consisting of or including one or more root sequence indices and/or the associated propagation delay difference map. In certain representative embodiments, the WTRU 102 may be signaled, via SI, whether to apply a default RACH root sequence set consisting of or including one or more root sequence indices and/or the associated propagation delay difference map.

In certain representative embodiments, the WTRU 102 may be configured with one or more procedures using or in the ME or the USIM to execute a scheme to determine the RACH root sequence set and/or the associated propagation delay difference map.

In certain representative embodiments, the WTRU 102 may be configured with one or more procedures to generate the default RACH root sequence set consisting of or including one or more root sequence indices.

In certain representative embodiments, the WTRU 102 may select the RACH root sequence index from the RACH root sequence set, for example by comparing an estimated propagation delay difference to the propagation delay thresholds signaled by gNB. In certain representative embodiments, the WTRU 102 may select the RACH root sequence index from the RACH root sequence set, for example by comparing the estimated propagation delay difference to the propagation delay thresholds defaulted from the ME/USIM.

Representative RACH Procedure for Aerial WTRUs

The aforementioned embodiments naturally extend to the case of Aerial Vehicles (e.g., Unmanned Aerial Vehicles/Drones). In the more general case, the Nadir N, need not be on the surface of the earth (as discussed previously), but can be at an arbitrary altitude, where the latter is signaled by the gNB 180/NAP 210 and/or may be preconfigured in the USIM. For example, one or more signaled altitudes may represent a maximum height at which a drone can operate and/or a height that the drone is currently operating in the system. Based on the one or more signaled altitudes, the parameter $D_{min}$ can be calculated once the position of the satellite S is known as described earlier. In certain representative embodiments, the gNB 180/NAP 210 may signal $D_{min}$ through one or more SI messages and/or via other means so that any WTRU 102 (aerial/terrestrial) may implement Equation (1) to calculate δ. The rest of the procedure for preamble selection follows similar techniques described previously as in Equation 4, or Equation 5.

FIG. 7 is flowchart illustrating a representative procedure to perform RACH.

Referring to FIG. 7, a representative procedure 700 may include, at block 710, the WTRU 102 receiving preamble sets or root sequences associated with differential propagation delay thresholds. At block 720, the WTRU 102 may determine propagation delay between the WTRU 102 and the NAP 210. At block 730, the WTRU 102 may compare the determine propagation delay with differential propagation delay thresholds. At block 740, the WTRU 102 may select an appropriate preamble set or root sequence. At block 750, the WTRU 102 may perform a RACH procedure.

FIG. 8 is flowchart illustrating another representative procedure for selection of RACH preambles based on propagation delay related parameters/information.

Referring to FIG. 8, a representative procedure 800 may include, at block 810, the WTRU 102 receiving from a NAP 210, a set of preambles and corresponding propagation delay related thresholds. At block 820, the WTRU 102 may determine propagation delay related information associated with a distance between the WTRU and the NAP or a location in a coverage of the NAP 210. At block 830, the WTRU 102 may select a subset of preambles from the set of preambles based on the determined propagation delay related information. At block 840, the WTRU 102 may randomly select a preamble from the selected subset of preambles. At block 850, the WTRU 102 may send the randomly selected preamble to the NAP.

In certain representative embodiments, the WTRU 102 may choose a root sequence, wherein the selecting of the subset of preambles includes selecting the subset of preambles in accordance with the chosen root sequence.

In certain representative embodiments, the WTRU 102 may receive from the NAP, network access information; and may initiate network access using the network access information.

In certain representative embodiments, the WTRU 102 may determine a Random Access Radio Network Temporary Identifier (RA-RNTI) that is a function of, derived from or includes at least the propagation delay related information and may decode the network access information included in a Random Access Response (RAR) using the determined RA-RNTI.

In certain representative embodiments, the NAP 210 may be included in a satellite and/or may be part of a non-terrestrial network.

In certain representative embodiments, the propagation delay related information may include any of: (1) a distance from the WTRU 102 to the NAP 210; (2) a distance from the WTRU 102 to a nadir N of the NAP 210; (3) an angle between a line extending between the WTRU 102 and the NAP 210 and a line extending between the nadir N of the NAP 210 and the NAP 210; or (4) the propagation delay or a differential propagation delay of a signal sent between the WTRU 102 and the NAP 210.

In certain representative embodiments, the WTRU 102 may receive via broadcast information or dedicated signaling, a Random Access configuration including the set of propagation delay related thresholds and any of: (1) location information indicating a location of the NAP 210; or (2) path information indicating a path to be traversed by the NAP 210.

In certain representative embodiments, the WTRU 102 may select one orthogonal subset of the set of preambles that corresponds to a particular portion of the coverage of the NAP 210.

In certain representative embodiments, each portion of the coverage of the NAP 210 may correspond to a respectively different subset of the set of preambles.

In certain representative embodiments, each orthogonal subset of the set of preambles may be any of: (1) preconfigured with corresponding propagation delay related thresholds; or (2) signaled explicitly by the NAP 210.

In certain representative embodiments, the selected subset of the set of preambles may correspond to an annular or oval ring shaped region or a portion of the annular or the oval ring shaped region of a coverage area. It is contemplated that the coverage of the NAP is a coverage volume which may correspond with the terrestrial surface (e.g., Earth's surface) to generally define a coverage area.

In certain representative embodiments, the WTRU 102 may determine a subregion of the coverage area of the NAP 210 and may select the subset of preambles associated with the subregion of the coverage area by, for example any of: (1) comparing a determined value of the propagation delay related information to one or more propagation delay related thresholds; or (2) via a lookup table associated with the determined value of the propagation delay related information.

In certain representative embodiments, the WTRU 102 may receive from the NAP 210 via system information any of: (1) GNSS coordinates periodically or (2) a serviceable elevation angle of the NAP 210.

In certain representative embodiments, the WTRU 102 may receive from the NAP 210, restriction information and in accordance with the restriction information may restrict any of: (1) one or more RACH occasions to send the randomly selected preamble to the NAP 210; or (2) a number of cyclic shifts associated of a RACH root sequence used by the WTRU 102.

In certain representative embodiments, the WTRU 102 may restrict the randomly selected preamble to a first RACH occasion or a first set of RACH occasions, on condition that the WTRU 102 is in any of: (1) a first coverage area of the NAP 210; (2) a first range of distances to a nadir N of the NAP 210; (3) a first range of distances to the NAP 210, or (4) a first range of propagation delays to the NAP 210.

In certain representative embodiments, the WTRU 102 may restrict the randomly selected preamble to a second RACH occasion or a second set of RACH occasions, on condition that the WTRU 102 is in any of: (1) a second coverage area of the NAP 210; (2) a second range of distances to a nadir N of the NAP 210; (3) a second range of distances to the NAP 210, or (4) a second range of propagation delays to the NAP 210.

In certain representative embodiments, the WTRU 102 may determine an altitude of the WTRU such that the propagation delay related information may be further based on the determined altitude.

In certain representative embodiments, the WTRU 102 may determine an altitude of the WTRU 102 and may determine the propagation delay related information as function of the determined altitude, on condition that the determined altitude exceeds a threshold value.

In certain representative embodiments, the WTRU 102 may determine a type of WTRU 102 and may determine the propagation delay related information based on an altitude of the WTRU 102 on condition that the determined type is a first type of WTRU 102. For example, the first type of WTRU 102 may be an aerial drone and/or an aerial device.

In certain representative embodiments, each preamble of the selected subset of preambles may be: (1) a cyclically shifted version of a CAZAC root sequence.

In certain representative embodiments, the selected preamble may be a random access preamble (RAP) sent in a RAP message and the received network access information may be received in a random access response (RAR) message that is in response to the RAP message.

In certain representative embodiments, the network access information may include a timing advance for the WTRU 102 and/or a power command for the WTRU 102.

FIG. 9 is flowchart illustrating another representative procedure using a Random Access-Radio Network Temporary Identifier (RA-RNTI) as a function of, including or derived from propagation delay related parameter/information.

Referring to FIG. 9, a representative procedure 900 may include, at block 910, the WTRU 102 determining propagation delay related information associated with a distance between the WTRU 102 and a NAP 210 or a location in a coverage of the NAP 210. At block 920, the WTRU 102 may receive a Random Access Response (RAR) masked with a Random Access-Radio Network Temporary Identifier (RA-RNTI) that is a function of, derived from or includes at least the determined propagation delay related information. At block 930, the WTRU 102 may determine the RA-RNTI based on the determined propagation delay related information. At block 940, the WTRU 102 may decode the RAR using the determined RA-RNTI.

In certain representative embodiments, the WTRU 102 may send to a network entity (e.g., NAP 210), a message with a timing advance and a power level derived based on information indicated by the RAR.

In certain representative embodiments, the WTRU 102 may send to a network entity 210, a Random Access Preamble (RAP) that may indicate the RA-RNTI associated with the WTRU 102.

In certain representative embodiments, the WTRU 102 may select a subset of RAPs from the set of RAPs based on the determined propagation delay related information and may randomly select the RAP from the selected subset of RAPs.

In certain representative embodiments, the RAR may be masked with or scrambled with the RA-RNTI and the RA-RNTI may be a function of a propagation delay or a differential propagation delay and any of: (1) a subframe index; or (2) a Physical Random Access Channel (PRACH) resource index.

In certain representative embodiments, the WTRU 102 may compare the RA-RNTI associated with the received RAR with the RA-RNTI determined based on the determined propagation delay related information, as a RA-RNTI comparison result and may determine whether the received RAR is intended for the WTRU 102 using the RA-RNTI comparison result.

In certain representative embodiments, the WTRU 102 may decode the received RAR on condition that on the RAR is intended for the WTRU 102 in accordance with the RA-RNTI comparison result.

In certain representative embodiments, the propagation delay related information includes any of: (1) a distance from the WTRU 102 to the NAP 210; (2) a distance from the WTRU 102 to a nadir N of the NAP 210; (3) an angle between a line extending between the WTRU 102 and the NAP 210 and a line extending between the nadir N of the NAP 210 and the NAP 210; or (4) the propagation delay of a signal sent between the WTRU 102 and the NAP 210.

The terms "differential propagation delay" and "propagation delay differences" may be used interchangeably herein and generally refer to the propagation delay associated with a WTRU in a spot beam that may exceed a minimum propagation delay (e.g., associated with the nadir N of the spotbeam) or a pre-established or signaled propagation delay (e.g., associated with a border of a sub-spot beam).

Although the disclosure illustrates the use of propagation delay differences for preamble and root sequence selection, one of skill understands that any propagation delay related information/parameter may be used for such a selection.

Although the disclosure illustrates the use of propagation delay differences for RA-RNTI derivation, one of skill understands that any propagation delay related information/parameter may be used for such a derivation.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided, for example, with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

What is claimed:

1. A method implemented by Wireless Transmit/Receive Unit (WTRU), the method comprising:
   receiving, by the WTRU from a Network Access Point (NAP), configuration information indicating a set of preambles and corresponding propagation-delay thresholds;
   determining propagation-delay information associated with a distance between the WTRU and the NAP or a location in a coverage area of the NAP;
   selecting a subset of preambles from the set of preambles based on the determined propagation-delay information;
   randomly selecting a preamble from the selected subset of preambles; and
   sending the randomly selected preamble to the NAP.

2. The method of claim 1, comprising selecting a root sequence using the determined propagation-delay information.

3. The method of claim 1, further comprising:
   receiving, by the WTRU from the NAP, network access information;

initiating, by the WTRU, network access using the network access information;

determining, by the WTRU, a Random Access Radio Network Temporary Identifier (RA-RNTI) that is a function of, derived from, or includes, at least the determined propagation-delay information; and decoding, by the WTRU, the network access information included in a Random Access Response (RAR) using the determined RA-RNTI.

4. The method of claim 1, wherein the NAP is included in a satellite and is a part of a non-terrestrial network, the method further comprising:

receiving, by the WTRU from the NAP, via system information, any of: (1) global navigation satellite system GNSS coordinates periodically or (2) a serviceable elevation angle of the NAP; and determining an altitude of the WTRU, wherein the determining of the propagation-delay information is further based on the determined altitude and the received system information.

5. The method of claim 1, wherein the propagation-delay information includes any of: (1) a distance from the WTRU to the NAP; (2) a distance from the WTRU to a nadir of the NAP; (3) an angle between a line extending between the WTRU and the NAP and a line extending between the nadir of the NAP and the NAP; or (4) the propagation delay or a differential propagation delay of a signal sent between the WTRU and the NAP.

6. The method of claim 1, further comprising receiving, by the WTRU, via broadcast information or dedicated signaling, Random Access configuration information indicating the set of propagation-delay thresholds and any of: (1) location information indicating a location of the NAP; or (2) path information indicating a path to be traversed by the NAP.

7. The method of claim 1, wherein:

the selecting of the subset of preambles from the set of preambles includes selecting one orthogonal subset of the set of preambles that corresponds to a particular portion of the coverage area of the NAP;

each portion of the coverage area of the NAP corresponds to a different subset of the set of preambles; and each orthogonal subset of the set of preambles are any of: (1) preconfigured with corresponding propagation-delay thresholds; or (2) signaled explicitly by the NAP.

8. The method of claim 1, wherein the selecting of the subset of preambles from a set of preambles includes:

determining a subregion of the coverage area of the NAP; and selecting the subset of preambles associated with the subregion of the coverage area of the NAP by any of: (1) comparing a determined value of the propagation-delay information to one or more propagation-delay thresholds; or (2) via a lookup table associated with the determined value of the propagation-delay information.

9. The method of claim 1, further comprising:

receiving, by the WTRU from the NAP, restriction information; and restricting in accordance with the restriction information any of: (1) one or more Random Access Channel (RACH) occasions to send the randomly selected preamble to the NAP; or (2) a number of cyclic shifts associated of a RACH root sequence used by the WTRU.

10. The method of claim 1, wherein:

the sending of the randomly selected preamble is restricted to a first Random Access Channel (RACH) occasion or a first set of RACH occasions, on condition that the WTRU is in any of: (1) a first coverage area of the NAP; (2) a first range of distances to a nadir of the NAP; (3) a first range of distances to the NAP, or (4) a first range of propagation delays to the NAP; and the sending of the randomly selected preamble is restricted to a second RACH occasion or a second set of RACH occasions, on condition that the WTRU is in any of: (1) a second coverage area of the NAP; (2) a second range of distances to a nadir of the NAP; (3) a second range of distances to the NAP, or (4) a second range of propagation delays to the NAP.

11. A Wireless Transmit/Receive Unit (WTRU), comprising:

a transceiver configured to receive from a Network Access Point (NAP), configuration information indicating a set of preambles and corresponding propagation-delay thresholds; and a processor configured to:

determine propagation-delay information associated with a distance between the WTRU and the NAP or a location in a coverage area of the NAP, select a subset of preambles from the set of preambles based on the determined propagation-delay information, and randomly select a preamble from the selected subset of preambles, wherein the transceiver is configured to send the randomly selected preamble to the NAP.

12. The WTRU of claim 11, wherein the processor is configured to:

select a root sequence using the determined propagation-delay information.

13. The WTRU of claim 11, wherein:

the transceiver is configured to receive from the NAP, network access information; and the processor is configured to:

initiate network access using the network access information;

determine a Random Access Radio Network Temporary Identifier (RA-RNTI) that is a function of, derived from, or includes, at least the propagation-delay information; and decode the network access information included in a Random Access Response (RAR) using the determined RA-RNTI.

14. The WTRU of claim 11, wherein the propagation-delay information includes any of: (1) a distance from the WTRU to the NAP; (2) a distance from the WTRU to a nadir of the NAP; (3) an angle between a line extending between the WTRU and the NAP and a line extending between the nadir of the NAP and the NAP; or (4) the propagation delay or a differential propagation delay of a signal sent between the WTRU and the NAP.

15. The WTRU of claim 11, wherein the transceiver is configured to receive, via broadcast information or dedicated signaling, a Random Access configuration including the set of propagation-delay thresholds and any of: (1) location information indicating a location of the NAP; or (2) path information indicating a path to be traversed by the NAP.

16. The WTRU of claim 11, wherein:

the processor is configured to select one orthogonal subset of the set of preambles that corresponds to a particular portion of the coverage area of the NAP;

each portion of the coverage area of the NAP corresponds to a different subset of the set of preambles; and each orthogonal subset of the set of preambles are any of:
(1) preconfigured with corresponding propagation-delay thresholds; or (2) signaled explicitly by the NAP.

17. The WTRU of claim 11, wherein the processor is configured to:
   determine a subregion of the coverage area of the NAP; and
   select the subset of preambles associated with the subregion of the coverage area by any of: (1) comparing a determined value of the propagation-delay information to one or more propagation-delay thresholds; or (2) via a lookup table associated with the determined value of the propagation-delay information.

18. The WTRU of claim 11, wherein the processor is configured to determine the propagation-delay information in accordance with location information indicating a location of the NAP; or (2) path information indicating a path to be traversed by the NAP.

19. The WTRU of claim 11, further comprising:
   the transceiver is configured to receive from the NAP, restriction information; and
   the processor is configured to restrict in accordance with the restriction information any of: (1) one or more RACH occasions to send the randomly selected preamble to the NAP; or (2) a number of cyclic shifts associated of a RACH root sequence used by the WTRU.

20. The WTRU of claim 11, wherein the processor is configured to:
   restrict the randomly selected preamble to a first RACH occasion or a first set of RACH occasions, on condition that the WTRU is in any of: (1) a first coverage area of the NAP; (2) a first range of distances to a nadir of the NAP; (3) a first range of distances to the NAP, or (4) a first range of propagation delays to the NAP; and
   restrict the randomly selected preamble to a second RACH occasion or a second set of RACH occasions, on condition that the WTRU is in any of: (1) a second coverage area of the NAP; (2) a second range of distances to a nadir of the NAP; (3) a second range of distances to the NAP, or (4) a second range of propagation delays to the NAP.

\* \* \* \* \*